(12) United States Patent
Ansari et al.

(10) Patent No.: US 8,091,132 B2
(45) Date of Patent: Jan. 3, 2012

(54) BEHAVIOR-BASED TRAFFIC DIFFERENTIATION (BTD) FOR DEFENDING AGAINST DISTRIBUTED DENIAL OF SERVICE (DDOS) ATTACKS

(75) Inventors: Nirwan Ansari, Montville, NJ (US); Zhiqiang Gao, Westfield, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 711 days.

(21) Appl. No.: 11/682,119

(22) Filed: Mar. 5, 2007

(65) Prior Publication Data
US 2007/0209068 A1   Sep. 6, 2007

Related U.S. Application Data

(60) Provisional application No. 60/778,662, filed on Mar. 3, 2006.

(51) Int. Cl.
*G06F 12/14* (2006.01)
(52) U.S. Cl. ........................................................ 726/23
(58) Field of Classification Search ................... 713/23; 370/230, 235, 232; 726/23
See application file for complete search history.

(56) References Cited

U.S. PATENT DOCUMENTS

| | | | | |
|---|---|---|---|---|
| 6,157,615 | A * | 12/2000 | Akagawa et al. | 370/241 |
| 6,215,769 | B1 * | 4/2001 | Ghani et al. | 370/230 |
| 6,970,426 | B1 * | 11/2005 | Haddock | 370/235.1 |
| 7,404,210 | B2 | 7/2008 | Lin | |
| 2003/0048791 | A1 * | 3/2003 | De Cnodder et al. | 370/395.42 |
| 2004/0233846 | A1 * | 11/2004 | Khandani et al. | 370/235 |
| 2007/0008883 | A1 * | 1/2007 | Kobayashi | 370/230 |
| 2007/0064610 | A1 * | 3/2007 | Khandani et al. | 370/235 |
| 2009/0086628 | A1 * | 4/2009 | Gracon et al. | 370/230 |

FOREIGN PATENT DOCUMENTS

| | | | |
|---|---|---|---|
| JP | 2005073272 | A | 3/2005 |
| JP | 2005229234 | A | 8/2005 |

OTHER PUBLICATIONS

Beale, J., et al. (2003). Snort 2.0 Intrusion Detection, pp. 9, 22, 28, 32, 59, 66, 93, 97, 98, 119, 133, 134, 135, 199, 210, 219, 288.*
Nikos, P.(2001). Traffic Shaping and BW Allocation. Retreived from http: www.telecom.tuc.gr/.../traffic_shaping&bq_allocation.ppt.*
Beale, J. (2004). Snort 2.1 Intrusion Detection. pp. 1-753.*

(Continued)

*Primary Examiner* — Matthew Henning
*Assistant Examiner* — Brian Shaw
(74) *Attorney, Agent, or Firm* — Connolly Bove Lodge & Hutz LLP

(57) ABSTRACT

Embodiments are directed toward a method for Behavior-based Traffic Differentiation (BTD) that initially receives incoming packets and performs traffic classification to determine the protocol of the incoming packets. In addition, BTD performs bandwidth division/allocation to further support traffic classification amongst non-TCP traffic such as UDP and ICMP. For TCP traffic, the method for BTD determines whether a TCP connection has been established and performs at least one of rate limiting, waiting time reduction for half-open connections, and incrementing backlog queue size when the TCP connection has not been established. If the TCP connection has been established successfully, the method for BTD further includes proactive tests for traffic differentiation which identify normal traffic, which is admitted, and attack traffic, which is dropped.

26 Claims, 7 Drawing Sheets

OTHER PUBLICATIONS

Cisco_defeating (Defeating DDOS Attacks, 2004).*
Garg (Mitigation of DoS attacks through QoS regulation, 2002).*
Jacobson (Congestion Avoidance and Control, 1988).*
RFC_2123 (Traffic Flow Measurement: Experiences with NeTraMet, 1997).*
Xu et al. (2005). On the robustness of router-based denial-of-service (DoS) defense systems. ADM SIGCOMM Computer Communication Review, vol. 35 Issue 3, Jul. 2005.*
Office Action issued in related Japanese Application 2008-557527.

* cited by examiner

BEHAVIOR-BASED TRAFFIC DIFFERENTIATION (BTD) FOR DEFENDING AGAINST DISTRIBUTED DENIAL OF SERVICE (DDOS) ATTACKS

DESCRIPTION OF BACKGROUND ART

The proliferation of e-business applications and mission-critical military communications has raised serious concerns on network security on the Internet. The advent of the lethal Denial of Service (DoS) attack and its advanced variant, the Distributed DoS (DDoS) attack are troublesome intruders on our usage and dependence on the Internet. The detrimental impact of DoS/DDoS attacks has been demonstrated again and again, even on such high-profile sites as Yahoo, CNN, Ebay and Amazon.

In a DDoS attack, an attacker sends a large volume of malicious traffic to a victim. For example, a DDoS attacker may infiltrate one or a plurality of computers at various data centers via a computer system connected to the Internet. Often the attacker will access the Internet through an Internet Service Provider (ISP). The attacker can then place the plurality of computers at the data centers under its control by use of a malicious software program. When the attacker issues a command, these computers can simultaneously send out large volumes of data at various times to the victim preventing the victim from responding to legitimate Internet traffic and messages.

Currently, DDoS attacks are probably the most ferocious threats to the Internet community. DDoS attacks exploit and consume the limited available resources of a system by sending superficially normal but really useless packets to degrade/corrupt the victim system, thus severely hampering the victim system from serving its normal clients. Typical resources that get drained in DoS/DDoS attacks are network bandwidth, CPU cycles of the target host, and specific TCP/IP protocol stack structure such as fragmentation buffer and TCP SYN buffer. In addition, readily accessible attack scripts prevalent in the Internet significantly decrease the technical hurdle to bombard DDoS attacks. Lack of accounting in the Internet further allures crackers to take their chances to attack others without worrying about any subsequent penalties.

It is well known that it is rather easy to launch, but difficult to defend, a DDoS attack. The underlying reasons include: (1) IP spoofing (i.e., attack packets routinely carry forged source IP addresses, which effectively conceal the identity of attack sources and deter the efforts of detection, defense, and tracing); (2) the distributed nature of the DDoS attack (i.e., a huge number of sources generate attack traffic simultaneously that impose an overwhelming burden on any countermeasure by invoking issues of scalability to handle increasingly powerful attacks); (3) no simple mechanism for the victim to distinguish the normal packets from the lethal attack traffic.

As a result of the above, improving the sustainability of networks and hosts (especially servers) by defending against DDoS attacks are an important goal in this technology area. A critical issue in DDoS defense is how to isolate the attack traffic from the normal traffic. This issue is referred to as "traffic differentiation" and is of great importance because the goal of DDoS attack is to severely degrade the performance of target hosts and networks or even completely deprive the victim of the capability of serving its normal clients. With the knowledge of which is "attack" and which is "normal" traffic in hand, the victim is ready to defeat a DDoS attack by reacting differently according to the type of traffic (i.e., attack or normal).

In addition, given the diverse DDoS attack patterns, another issue of importance is how to contain as many DDoS attack patterns as possible. Exemplary DDoS attack patterns are given in: C. Douligeris and A. Mitrokotsa, "DDoS attacks and defense mechanisms: classification and state-of-the-art," *Computer Networks*, vol. 44, pp. 643-666, 2004; and J. Mirkovic and P. Reiher, "A taxonomy of DDoS attack and DDoS defense mechanisms," *ACM SIGCOMM Computer Communications Review*, vol. 34, no. 2, pp. 39-53, April 2004.

From the perspective of protocol exploits, DDoS attacks may be TCP, UDP, ICMP, or other protocols based. Some attacks use the combination of different protocols as shown in Table 1 below. From the point of view of the attack rate, most attacks are high-speed flood-based while a novel and more sophisticated attack is low-rate DDoS attack as given in: R. Chang, "Defending against flooding-based, Distributed Denial of Service attacks: a tutorial," *IEEE Communications Magazine*, vol. 40, no. 10, pp. 42-51, 2002; and A. Kuzmanovic and E. knightly, "Low-Rate TCP-Targeted Denial of Service Attacks (The Shrew vs. the Mice and Elephants)," *ACM SIGCOMM* 2003, August 2003, pp. 75-86.

TABLE 1

| Diverse DDoS attack tools | |
|---|---|
| Protocols Used | DoS/DDoS Attack Tools/Names |
| TCP only | SYN flood, RST flood, mstream |
| UDP only | trinoo, shaft |
| ICMP only | Ping of death, flood pinging, Smurf |
| Combinations of TCP, UDP, and ICMP | TFN, TFN2k, MIX, Stacheldraht, trinity, v3 |

Unfortunately, in contrast to attack schemes, defense schemes do not keep pace with the evolution of DDoS attacks. Most background art DDoS defense schemes aim to address one or two types of DDoS attacks and are inefficient and ineffective to the wide spectrum of possible patterns of DDoS attacks.

SUMMARY

Embodiments are directed at overcoming the foregoing and other difficulties encountered by the background arts. In particular, embodiments of behavior-based traffic differentiation (BTD) provide a novel framework that can proactively identify and deter most of the malicious attack traffic, and tackle a variety of DDoS attack patterns as well. Two components of the framework are traffic classification and traffic differentiation. Traffic classification aims to address non-TCP flood attacks while traffic differentiation is used to identify malicious TCP flows. Embodiments of BTD are implemented, for example, but not limited to ns-2. Experimental results indicate that traffic classification can improve the throughput of TCP traffic significantly (i.e., by over 70%) while traffic differentiation can quickly block malicious attack traffic. Other benefits of our embodiments of BTD include, but are not limited to: (1) minimal requirements for equipment/system modification; (2) practically deployable; (3) no issues of scalability because the deployment is at the receiver side only; (4) no issue of lack of incentives since the deployment of our scheme is served to solely protect one's own networks and hosts, not others.

DETAILED DESCRIPTION

Embodiments of BTD attempt to isolate attack traffic and contain as many DDoS attack schemes as possible. DDoS attacks are a resource management problem, and thus embodiments adopt a QoS means to combat them. Embodiments of BTD use an integrated scheme to efficiently and effectively contain a variety of DDoS attack schemes rather than just one or two attack schemes, as in the background art. Embodiments of BTD can differentiate between malicious attack traffic and normal traffic, and can punish the malicious attack traffic. Embodiments of BTD are comprised of at least 2 components. The first component classifies different types of traffic based on the protocols used and limits their rates accordingly with bandwidth allocation. This method serves to isolate UDP, ICMP and other traffic from TCP, and is helpful in mitigating some flood-attacks based on UDP and ICMP via limiting bandwidth allocation to non-TCP traffic.

TCP is the dominant traffic on the Internet and most DDoS attacks are based on TCP. Thus, the next step is to differentiate disparate TCP traffic. All TCP traffic is categorized into two groups according to the status of the connection establishment. Among all connection-established TCP traffic, embodiments of BTD attempt to identify the properties of a flow, whether it is benign or malicious, according to its behavior. A flow is defined as "benign" or "normal" if it responds to the control signal of the other endpoint of the same connection appropriately. On the contrary, "malicious" or "attack" flows are those that do not follow the TCP congestion control principle and act aggressively.

It is possible that a TCP unfriendly flow is classified as a lethal flow, and is punished by embodiments of the BTD scheme. That is, a collateral side effect of embodiments of BTD is that it currently does not distinguish between a TCP unfriendly flow and an attack flow. Based on the distinction, certain penalties may be imposed to the aggressive flows of unfriendly flows.

In addition, embodiments of BTD are "victim-centered" and do not require any modification of the source endpoints or intermediate routers. This characteristic of BTD avoids the issues of scalability, cooperation between different domains, and lack of incentives. Extensive simulations have been conducted and experimental results are presented to validate the design of embodiments of BTD.

Figure 1:
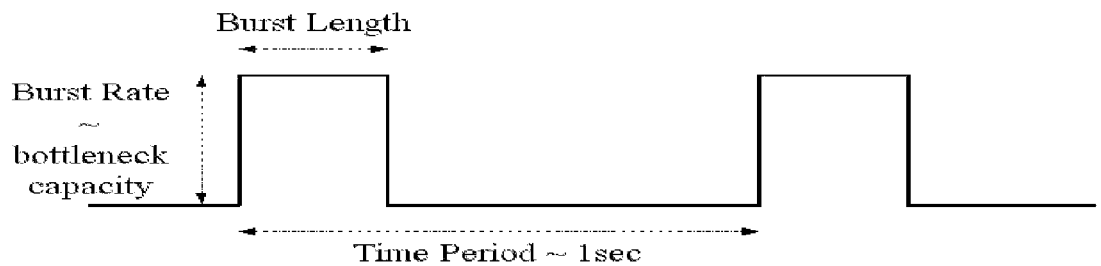
FIG. 1 is an exemplary illustration showing the timing of how low-rate DoS attacks are mounted by sending attack packets sporadically using an on-off model.

An ideal defensive scheme shall be able to distinguish between attack flows and normal ones, and isolate deleterious traffic accordingly. However, it is by no means trivial to make such a distinction. Embodiments of BTD identify malicious attack traffic from their behaviors. Besides IP spoofing, aggressiveness is the salient feature/behavior of DDoS traffic. One example of the aggressive behavior is that an attack source may not care about whether it may receive a response from the victim or not. If this is the case, an attacker can still conduct an attack whether or not a response is received by bombarding its target with a monstrous number of useless packets. Even the low-rate DoS attacks that mount attack packets sporadically using an on-off model, as shown in FIG. 1, demonstrate such aggressive features during the "on" stage.

Note that "aggressiveness" is not equivalent to "high-rate". It is possible that a high-rate flow is a normal TCP flow. The receiver may identify the aggressive behavior by intentionally testing the response of a source upon certain control signals from the receiver. Any source which fails such tests is regarded as a lethal attack source and can be punished accordingly.

However, a source that passes the test above may not necessarily be benign. The receiver (usually a server) is suggested to conduct the test upon any receipt of a request/requirement for a connection. That is, a sophisticated attacker may pass an initial test by behaving well at first and perform deleterious attack operations later. To handle this situation, the receiver may increase the frequency of such tests used to detect an attack flow. An alternative solution is to introduce some dynamics into the test and randomly determine the frequency and interval of the test for each flow, especially the high-rate one.

To accommodate high-rate legitimate traffic better, a threshold is set that defines the maximal number of successful tests for a flow. No more tests are conducted on packets from a flow once the flow successfully passes the specified number of tests. By actively testing a source, the receiver can determine with high confidence the nature of a flow (i.e., normal or attack) from that source and react accordingly.

Filtering based on behavior brings an attack source into a dilemma: (1) sending packet aggressively at the risk of being identified and punished; or (2) reducing attack rate to meet the requirements of the receiver so that the effect of an attack is diminished. In producing this dilemma for the attack source, embodiments of BTD allow the receiver to throttle the scope and impact of potential attacks.

The above design is feasible for TCP solely because TCP has the built-in congestion control and reliable transmission mechanism. Note that TCP is the dominant traffic on the Internet, and as much as 90% of DDoS traffic use TCP. Currently, TCP occupies 80% in terms of the number of flows, 90% with respect to the number of packets. Thus, it is essential for DDoS defense schemes to accommodate TCP traffic effectively and efficiently.

However, other traffic such as UDP and ICMP lack alternative mechanism that are exploitable by our framework. Embodiments of BTD use traffic classification to handle non-TCP traffic. Traffic classification is a simple and efficient solution to handle flood attacks based on UDP and ICMP. By limiting the resource allocated to UDP and ICMP traffic, the receiver may significantly mitigate UDP and ICMP flood attacks.

Another benefit of traffic classification is that UDP traffic is much more aggressive than TCP traffic. It is well established that when UDP traffic competes for bandwidth against TCP traffic, UDP is capable of seizing most of the available bandwidth due to its lack of any congestion control mechanism and being more aggressive in nature. Therefore, sending UDP traffic may deprive the fair share of bandwidth from the TCP traffic effectively, and degrade the performance of TCP streams. Thus, it turns out that UDP is a good vehicle for DDoS attacks. This demonstrates the difficulty in containing different kinds of DDoS attack patterns in one scheme, and justifies the necessity to also perform traffic classification.

Other issues that need to be accounted for include, but are not limited to: (1) methods for addressing IP spoofing; and (2) determining at what level the framework of embodiments should be performing (e.g., packet level or flow level). First, one identifies attack traffic with forged sources IP addresses, and then discerns the normal traffic with genuine IP addresses by observing their behaviors. Spoofing may be addressed by means of verification while aggressive behavior may be identified by manipulating the rate of returned ACK at the recipient side for TCP traffic. This method is also capable of identifying the more subtle and sophisticated low-rate DDoS attacks.

Figure 2:
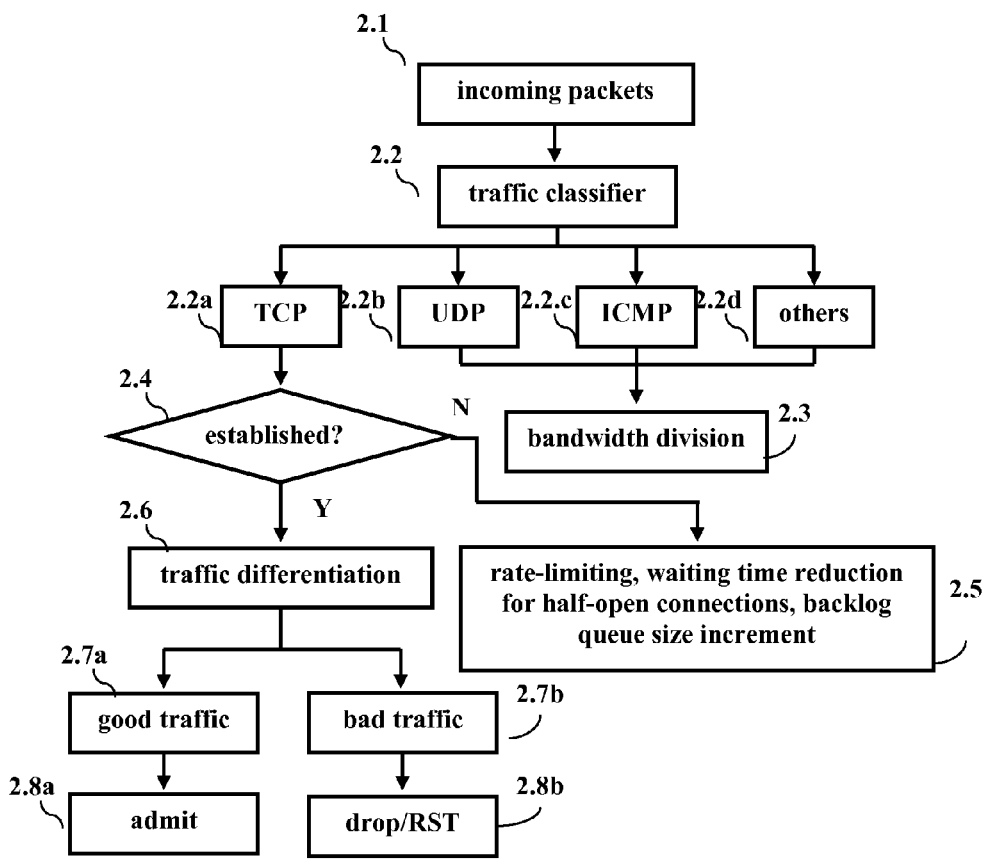
FIG. 2 depicts an exemplary flowchart of an embodiment of the BTD framework.

FIG. 2 depicts an exemplary flowchart of embodiments of the BTD framework. In Step 2.1 of FIG. 2, incoming packets are received by the BTD framework. At Step 2.2 a method for traffic classification is implemented. Step 2.3 implements a method of bandwidth division/allocation. In Step 2.4, a determination of whether the TCP connection has been established is made. If the TCP connection has not been established, at least one of rate limiting; waiting time reduction for half-open connections; and incrementing backlog queue size are performed in Step 2.5. Alternatively, if the TCP connection has been established a method for traffic differentiation is performed in Step 2.6.

As the result of the method for traffic differentiation, a determination is made of whether the packet is normal traffic or attack traffic in Step 2.7(a) and Step 2.7(b), respectively. If it is determined in Step 2.7(a) that normal traffic is being received, the received packet is admitted by the BTD framework in Step 2.8(a). Alternatively, if it is determined in Step 2.7(b) that attack traffic is being received, the received packet is dropped and denied admission by the BTD framework in Step 2.8(b). For a heavily loaded receiver (e.g., a server) that serves a huge amount of packets from disparate sources, embodiments of BTD shall make a fast and smart decision to admit or drop an incoming packet. The ever-increasing linkspeed motivates us to contrive countermeasures at the flow level.

The methods for Traffic Classification and Bandwidth Allocation are further discussed in the following paragraphs. In particular, methods for Traffic Classification in embodiments of BTD are discussed in the following. Since, as discussed above, UDP lacks built-in congestion control mechanisms and is aggressive in nature, embodiments of BTD first classify traffic based on protocols to isolate TCP and non-TCP traffic. Specifically, embodiments of BTD classify traffic into 4 groups: TCP, UDP, ICMP, and other. Embodiments of BTD implement this classification at least by checking the protocol field at the IP layer. Regarding bandwidth division/allocation, as a non-limiting example, a system administrator may configure its network and assign the bandwidth in the following way: TCP: 85%, UDP: 13%, ICMP 1%, and others 1%. This specific configuration is determined by the site's profile, and may be changed dynamically.

The goal of the method of traffic classification of embodiments of BTD is to determine, according to normal traffic profiles, whether it is necessary to implement a defense to mitigate the impact of possible UDP and ICMP flood attacks. Unlike TCP traffic, whose property may be identified according to its behavior, UDP is aggressive in nature. As a less "reliable" protocol, it turns out that no easy way may be taken to distinguish between normal UDP traffic and attack UDP traffic. However, by imposing a bandwidth limit, embodiments of BTD provide a simple but effective strategy to distinguish between the two and does not affect the network performance in most cases.

In addition, limiting the amount of ICMP traffic allowed into a network is a good practice because it is used solely for diagnostic purpose and ICMP-based DDoS attack are common.

Figure 3:
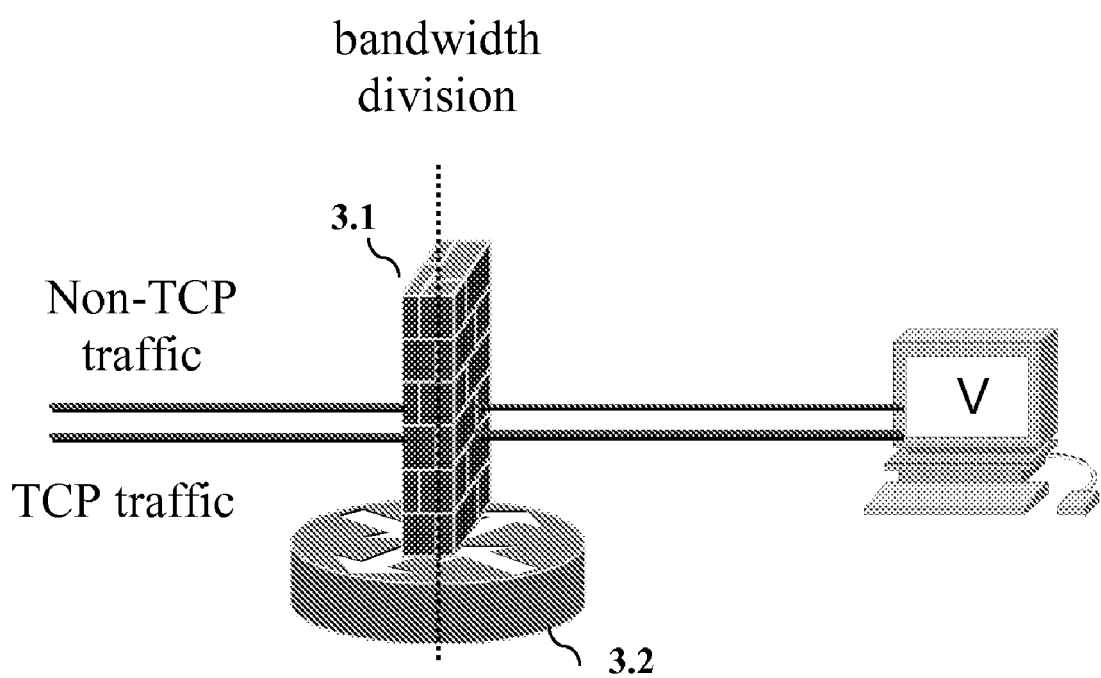
FIG. 3 is an exemplary illustration showing how traffic classification may be implemented at the entry point of the protected networks or systems at either a firewall or an edge router.

FIG. 3 shows how traffic classification may be implemented at the entry point of protected networks or systems, either at a firewall 3.1 or an edge router 3.2. The availability of network processors and other ASICs specifically designed for classification renders it possible for embodiments of BTD to be operated at line rate.

In considering the bandwidth allocation/division function of embodiments of BTD, the quota for each protocol is configurable and it is normally determined by the routine traffic profile at one site. As discussed above and in accordance with recent measurements, the dominant traffic in the current Internet is still TCP. Thus, it is reasonable to assign most of the bandwidth to TCP traffic for a normal site because most killer applications such as web, email, telnet, and FTP all use TCP. For example, a possible bandwidth allocation/division among different protocols is TCP: 88%, UDP: 10%, ICMP: 1%, and other: 1%. In case of a traffic pattern change in the future, what embodiments of BTD provide is a variable bandwidth allocation that is able to adjust the bandwidth allocation percentage according to the new traffic model, and thus, embodiments of BTD can be easily tailored for future traffic changes.

The method of TCP Flow Differentiation in embodiments of BTD is discussed in the following paragraphs. Connection establishment determines whether or not a connection has been established and means a lot to the receiver. A successfully established connection indicates that both ends have completed the three-way handshaking procedure.

An even more important determination in DDoS defense is whether or not IP spoofing is being used by the source. For an incomplete connection, on the other hand, the receiver shall be alert, and be conservative in its resource consumption. Possible measures to mitigate potential attacks include, but are not limited to: (1) tightening the total bandwidth allocation to all incomplete connections; (2) significantly reducing the timeout value to avoid buffers occupied by half-open connections for a long time, or providing no buffer allocation at all for half-open connections; and (3) increasing the buffer size for backlogs. These options are shown in FIG. 2 at Step 2.5 and discussed above Analyzing normal or benign flows and lethal or attack flows are discussed in the following. After assigning the quota for each protocol, the next task is to isolate lethal or attack TCP flows from benign or normal TCP flows. This is done simply because TCP consumes most of the bandwidth of the protected network. As mentioned earlier, straightforwardly adopting fair packet queuing is impractical in case of flood-based DDoS attacks when a large majority of traffic is attack streams. TCP is an end-to-end solution that requires close orchestration between the sender and the receiver. To identify the nature of a TCP flow (i.e., after a successful connection), the receiver can actively test the response of the sender by delaying the ACK packets intentionally. If the sender is normal, it will take action accordingly and reduce its sending rate.

On the contrary, for a DDoS attack, two cases may occur. One is that the sender uses forged source IP addresses, and thus cannot receive the rate-reduction message from the receiver. It has no idea of the proper sending rate. The other scenario is that the sender does receive the notification, but it neglects it and just keeps sending packets, thus violating the protocol, and it may be punished by the recipient to reduce its share or even block its traffic. This procedure is dynamic. The protected site can decide the frequency and extent of rate-reduction so that no perpetrator can easily fool the system to believe that the traffic from the perpetrator is normal.

Figure 4:
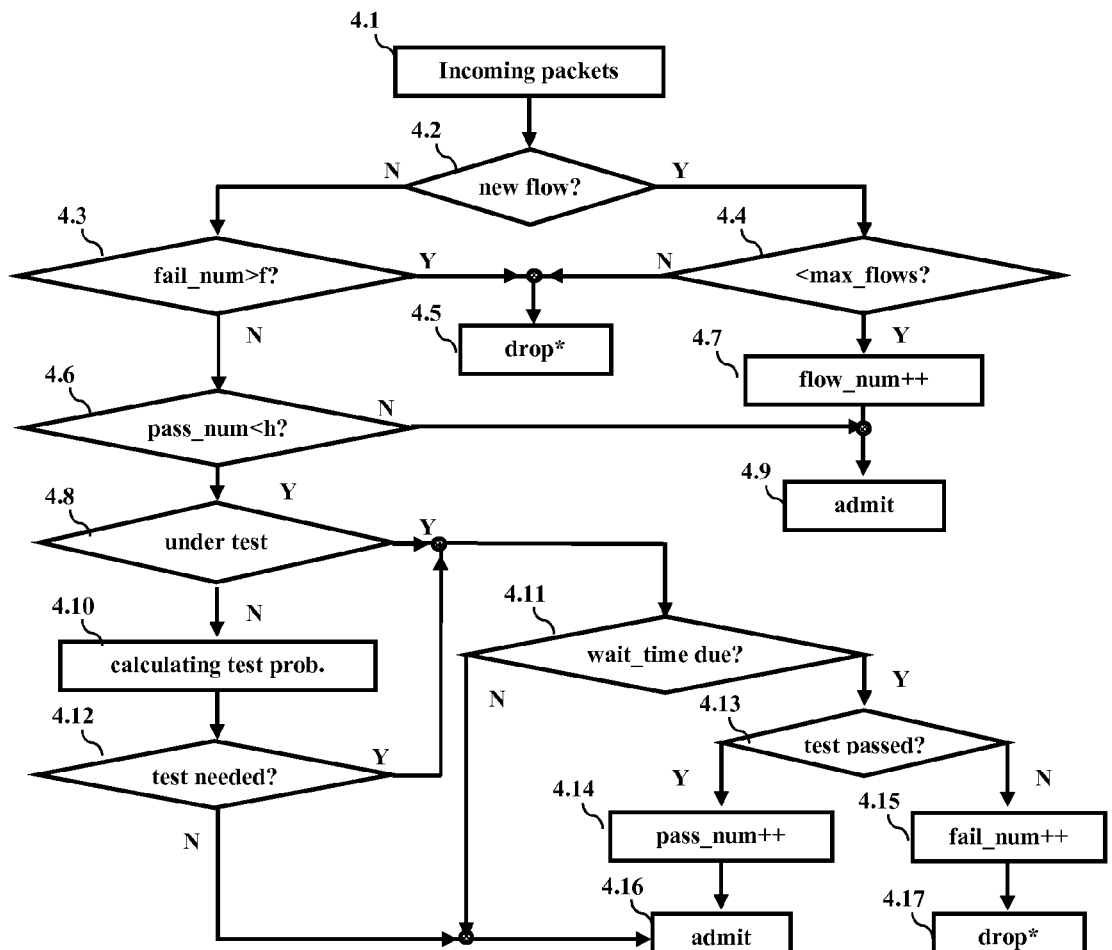
FIG. 4 is an exemplary flowchart for a method for traffic differentiation in embodiments of BTD.

FIG. 4 depicts an exemplary flowchart for a method for traffic differentiation in embodiments of BTD. Upon the arrival of a new incoming packet at Step 4.1, the receiver first determines where the flow of the current packet belongs by checking the tuple of (source IP address, source port number, destination IP address, destination port number) also in Step 4.1 of FIG. 4. In Step 4.2, if the method determines the packet is the first packet of a new flow, the receiver examines whether the number of admitted flows reaches the maximal flow count in Step 4.3 relative to a threshold set by the receiver to ensure provisioning of proper quality of service. If the maximal flow count does occur, the packet is dropped in Step 4.5. Otherwise, after updating the flow table maintained by the receiver, incrementing the flow count by 1, and initializing several counters, such as the number of successful tests and the number of failure tests in Step 4.7, the new packet is admitted in Step 4.9.

For the packet of an existing flow, the receiver checks the behavior history of the flow. In Step 4.3 of FIG. 4, if the number of failure tests is no less than a threshold, f, and the packet will be dropped in Step 4.5. An integer larger than 1 is selected to prevent embodiments of BTD from falsely identifying the behavior of a flow. A low value of f may exacerbate packet dropping. In case of a false identification, subsequent packets from an innocent flow will be blocked. Selecting a too high value is unwise, either. A high f delays the packet dropping decision, and thus subsequent packets of a malicious stream may still consume system resources. Experimental results indicate that f=3 provide a good balance between the proper identification rate and the acceptable performance impact.

In addition, it is worth mentioning that a receiver has a couple of options to choose to punish the source at this point. One option is to send DUPACK on purpose forcing the source into the stage of slow start. Another is to send RST to halt the connection so that its resource is not wasted by the misbehaving sources. In FIG. 4, we only show the operation of packet dropping without any further punishment.

For the flow whose behavior is not so bad in the past, embodiments of BTD further examine whether the flow has passed a certain number of tests, h as shown in Step 4.6 of FIG. 4. The receiver will admit directly any packet of flows having passed h tests successfully (e.g., some tradeoff has to be made to determine a proper value of h. Selecting a high h value may hurt the performance of a good but high rate flow, while the tests may be easily evaded by sophisticated attackers using a low value. In Step 4.6, we set h to 6 after extensive simulations).

For other flows, embodiments of BTD further check the current state of the flow in Step 4.8 of FIG. 4. If the flow is under a test, its current rate shall not exceed one half of its previous one (i.e., the receiver enforces this constraint by manipulating the reverse ACK rate). If the flow conforms to that constraint, the flow passes the current test in Step 4.13; the pass_num is incremented by 1 in Step 4.14; and the packet is admitted in Step 4.16. Otherwise, the flow fails one test in Step 4.13; the fail_num is incremented by 1 in Step 4.15; and the packet is dropped in Step 4.17.

In the case that Step 4.8 determines the flow is not in the state of testing, its sending rate is compared with that of the fair share of each flow. The result of the comparison is used to determine the test probability for that flow in Step 4.10. Step 4.12 determines whether a test is needed. Obviously, a flow with a smaller bandwidth assumption is subject to a smaller number of tests. Step 4.1 determines the waiting time between tests. The test probability p for a high-rate flow (over the faire share) is 1/(pass_num+1). At the very beginning, pass_num is 0 for all flows. Therefore, as long as a high-rate flow has not passed a test, its chance of being tested is 100%.

As the number of successful tests of a flow increases, its test probability reduces. The test probability p for less resource-consumption flow is 1/max(m, 2*h), where m is the total number of flows. For the normal case, m>>2h; thus, p=1/m. We use the max(.) function to address the case that only a few flows exist in the system and ensure that the test probability for a low-rate flow is at most ½ of that of a high-rate one.

The rate of a flow is calculated according to the following formula, $$(\text{num\_pkt} * \text{sz\_pkt})/t, \qquad (1)$$

where t is the time interval (window), num_pkt is the number of packets received during this period, sz_pkt the packet size. It is worth mentioning that the flow rate calculated here is not the average rate of a flow, as normally used by others, because we update the starting time of a flow once it passes a test. In so doing, we can effectively thwart low-rate DoS attack which sends a burst of attack packets to incite congestion and keeps silent for a much longer period to significantly lower its average rate in order to escape detection and filtering.

Four scenarios may happen: (1) an attack source always behaves well, and thus the effect of an attack is greatly diminished; (2) an attack source behaves well at first and misbehaves later. In this case, the constraint that the current rate is at most ½ of previous rate upon the test state will not be satisfied, and the source fails the test; (3) an attack source always misbehaves, that may be easily thwarted by the fail count; and (4) an attack source misbehaves at first and behaves well later. For scenario (4), the attack source is exposed to more chances of being tested because its pass_num is offset by the fail_num once it fails a test. It is noted that a low-rate flow is also subject to test, though at a lower probability in our design. As time passes by, the chance that a low-rate flow has never been tested by the receiver is very low. Embodiments of BTD enforce this policy to contain the case that some low-rate streams are malicious.

The Penalty for Bad TCP Flows is discussed in the following. A receiver has a couple of options to choose to punish the source. One option is to send DUPACK on purpose, thus forcing the source into the stage of slow start. Another is to send RST to halt the connection so that its resource is not wasted by the misbehaving sources. Embodiments of BTD send RST once the flow fails the tests 3 times. In FIG. 4, the operation of packet dropping is shown without any further punishment.

Figure 5:
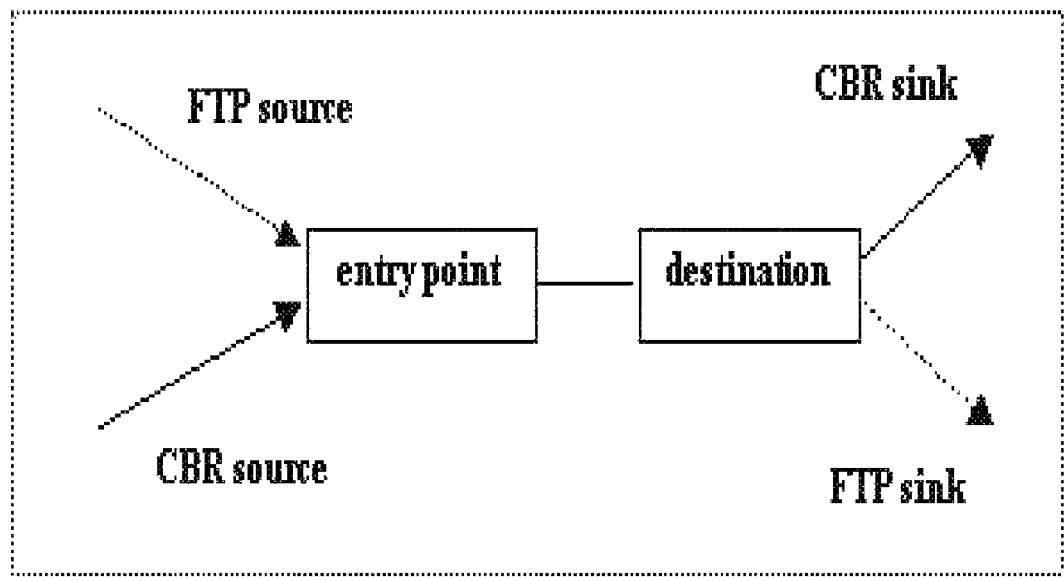
FIG. 5 illustrates an exemplary simulation scenario including one FTP source and sink (using TCP), and one CBR source and sink (using UDP).

Experimental results regarding traffic classification are discussed below. To test the effectiveness of traffic classification, we set up a simple simulation scenario including 1 FTP source and sink (using TCP), and 1 CBR source and sink (using UDP), as shown in FIG. 5. These flows pass through the same bottleneck link. The link parameters between the FTP source and the checking point, the CBR source to the checking point, destination and CBR sink, and destination and FTP sink are all 10 Mb in bandwidth, and 2 ms in delay. The bottleneck link between the checking point and the destination is set to be 1 Mb and 10 ms. The CBR rate is 10 Mb. The traffic classification for TCP is 90%, and UDP 10% at the checking point. In the comparison of simulations, everything is the same except whether the entry point enforces traffic classification or not. The throughput of the FTP traffic is presented in FIG. 6(a) and FIG. 6(b).

Figure 6A:
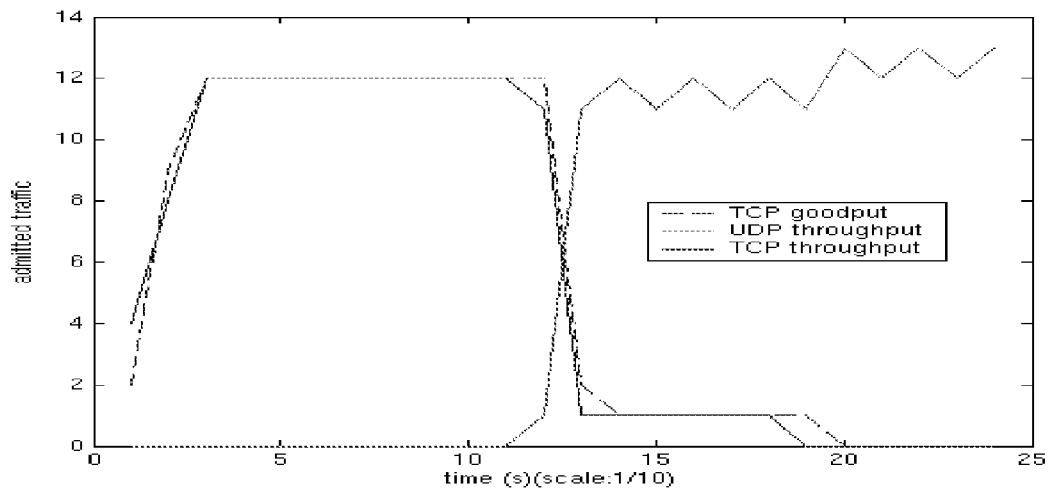
FIG. 6(a) is an exemplary illustration of TCP goodput and TCP throughput for the TCP flow and UDP throughput without the traffic classification policy.
Figure 6B:
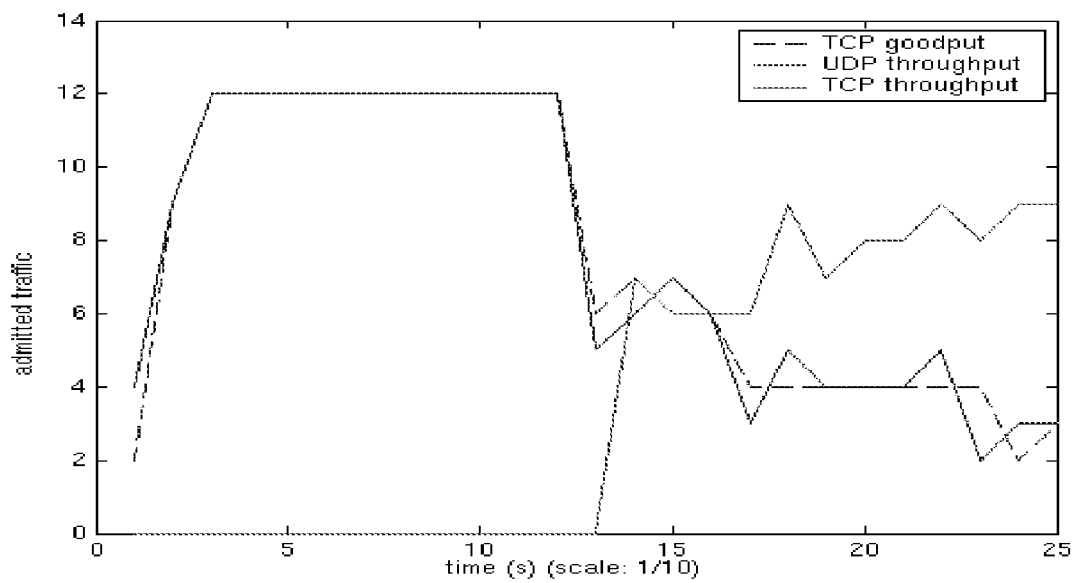
FIG. 6(b) is an exemplary illustration of TCP goodput and TCP throughput for the TCP flow and UDP throughput with the traffic classification policy.

FIG. 6(a) depicts TCP goodput and TCP throughput for the TCP flow and UDP throughput without the traffic classification policy. In FIG. 6(a) and FIG. 6(b), TCP traffic starts at time 0 s and UDP traffic begins 1 s later. During 0-1 s, TCP is the only traffic in the link and its goodput and throughput reaches 12 packets per 0.1 s, the maximal value (the bandwidth of the bottleneck link is 1 mb/s, each packet is 1000*8=8000 bits, 1 mb*0.1/8000=12). From 1.2 s on, UDP traffic starts to merge and it captures the available bandwidth so fast that TCP throughput reduces to 1 packet during 1.3-1.8 s, starving since 1.9 s. With traffic classification, in contrast, TCP throughput remains 3 packets per 0.1 s even after 1.9 s, while UDP traffic is no more than 9 packets per 0.1 s. The total number of packets sent is 127 in FIG. 6(a), 234 in FIG. 6(b) (we only depict the throughput till 1.9 s in FIG. 6(b) for comparison). Therefore, the throughput of TCP traffic is increased by 70.8% with traffic classification. Though UDP traffic still seizes more share than TCP, as explained above, this is due to the built-in congestion control mechanism of TCP.

Figure 7:
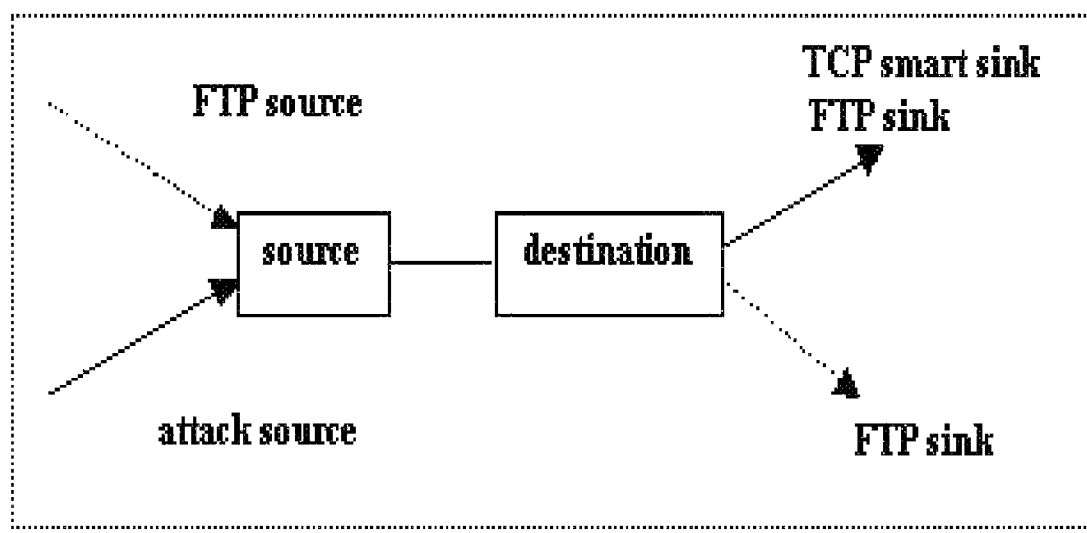
FIG. 7 illustrates exemplary experimental results showing the effectiveness of traffic differentiation in a simulation scenario including one FTP source and an attack source.

The following discusses TCP Flow Differentiation. To test the effectiveness of traffic flow differentiation, a simulation scenario including an FTP source and an attack source was set up, as shown in FIG. 7. These flows pass through the same bottleneck link. The difference is that one simulation uses a normal FTP sink to accept packets from both flows, another uses our developed TCP sink, called TCP smart sink. The simulation results are shown in FIG. 8(a) and FIG. 8(b).

Figure 8A:
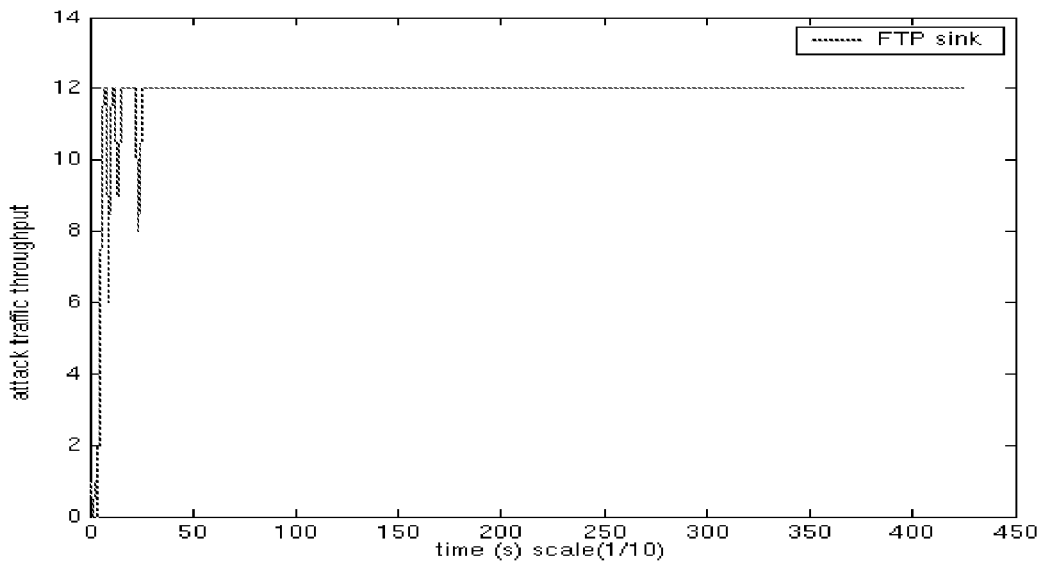
FIG. 8(a) are exemplary experimental results showing the throughput of the attack traffic using the FTP sink in embodiments of BTD.
Figure 8B:
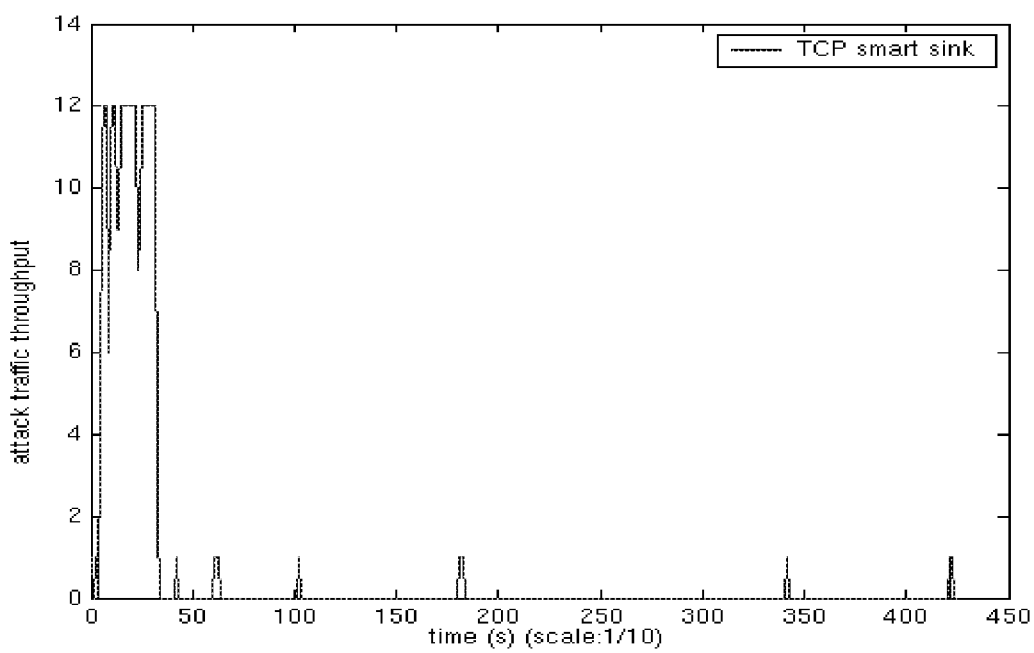
FIG. 8(b) are exemplary experimental results showing the throughput of the attack traffic using TCP smart sink in embodiments of BTD.

FIG. 8(a) shows the throughput of the attack traffic using the FTP sink while FIG. (8b) presents the throughput of the attack traffic using the TCP smart sink in embodiments of BTD. At 3.2 s, the throughput of attack traffic drops drastically. After 42.3 s, the attack traffic is totally blocked. In contrast, using the background art FTP sink as the receiver, the sender may keep the highest throughput during its lifetime. The result demonstrates the effectiveness of the traffic differentiation approach of embodiments of BTD.

As discussed above, embodiments of the BTD comprise two components: traffic classification and traffic differentiation. The former is used to reduce the volume of Non-TCP traffic while the latter can identify malicious TCP flows via proactive tests. The salient benefits of embodiments of BTD are listed as follows:

BTD can effectively and efficiently identify and block attack flows via proactive tests;
BTD can contain many DDoS attack patterns;
BTD requires minimal modification; and
BTD has no issues such as scalability and lack of incentives.

Simulation and the above-discussed experimental results have validated our design. In addition, the following are additional aspects of embodiments of BTD: (1) identifying the network condition automatically; (2) selecting various parameters used for proactive testing adaptively; and (3) implementing the framework in operating system environments such as, but not limited to: Linux kernel.

In summary, embodiments of BTD first try to reduce the volume of Non-TCP traffic via traffic classification, thus mitigating the popular UDP and ICMP flood attacks. For TCP flows, embodiments of BTD attempt to distinguish their nature by observing behaviors. Table 2 lists the policies adopted in the framework of embodiments of BTD to accommodate the normal traffic and to constrain the attack traffic.

TABLE 2

Measures taken by embodiments of BTD to address diverse traffic models

| traffic nature | Measures |
| --- | --- |
| high-rate attack traffic | 1) high test probability<br>2) dynamic in terms of detection frequency and intervals<br>3) after certain times of failures, all packets of the flow are dropped |
| high-rate good traffic | 1) after passing the test for certain times, all packets of the flow are accepted |
| low-rate attack traffic | 1) still subject to tests, though at a low probability. As time passes by, its chance of being tested increases.<br>2) Once a flow passes a test, its rate is calculated from the time when it passes the last test. Thus, a flow adopting the strategy of low-rate first and high-rate later cannot escape being identified.<br>3) after certain times of failures, all packets of the flow are dropped |
| low-rate good traffic | 1) low test probability<br>2) after passing the test for certain times, all packets of the flow are accepted |

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method or apparatus in accordance with claimed subject matter being executed, such as one of the embodiments previously described, for example. As one potential example, a computing platform may include an apparatus or means for implementing one or more processing units or processors, one or more input/output devices, such as a display, a keyboard and/or a mouse, and/or one or more memories, such as static random access memory, dynamic random access memory, flash memory, and/or a hard drive and one or more routers or firewall equipment. For example, a display may be employed to display one or more queries, such as those that may be interrelated, and or one or more tree expressions, although, again, claimed subject matter is not limited in scope to this example. Likewise, an embodiment may be implemented as a system, or as any combination of components such as computer systems and interfaces to computer systems (e.g., but not limited to: routers, firewalls, etc.), mobile and/or other types of communication systems and other well known electronic systems.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
examining a first incoming packet to determine if it is associated with an individual TCP flow of an admitted TCP connection;
responsive to determining that the first incoming packet is associated with an individual TCP flow of an admitted TCP connection, calculating a probability of testing the individual TCP flow of the admitted TCP connection with which the first incoming packet is determined to be associated;
determining, based on the probability of testing the individual TCP flow, if the individual TCP flow is to be tested to determine if the individual TCP flow represents an attack flow or a benign flow;
responsive to determining that the individual TCP flow is to be tested, testing the individual TCP flow to determine if the individual TCP flow represents an attack flow or a benign flow, said testing including:
delaying transmission of an acknowledgment of the first incoming packet to a source of the individual TCP flow; and
determining, based on at least one further incoming packet associated with the individual TCP flow, if the source of the individual TCP flow adjusts its transmission rate in response to the delaying; and
admitting the first incoming packet if the source of the individual TCP flow adjusts its transmission rate in response to the delaying.

2. The method of claim 1, further comprising:
responsive to determining that the first incoming packet is not associated with an admitted TCP connection, determining if an existing number of admitted TCP connections is less than a first predetermined threshold; and
responsive to determining that the existing number of admitted TCP connections is less than the first predetermined threshold, admitting a further TCP connection and admitting the first incoming packet.

3. The method of claim 2, wherein admitting the further TCP connection includes initializing a test probability associated with a TCP flow of the further TCP connection to one.

4. The method of claim 1, further comprising:
for a respective individual TCP flow, maintaining a number of times that the source of the respective individual TCP flow reduces its transmission rate in response to the delaying, as a success count, and maintaining a number of times that the source of the respective individual TCP flow does not reduce its transmission rate in response to the delaying, as a failure count.

5. The method of claim 4, further comprising:
dropping the first incoming packet if it is associated with an admitted individual TCP flow whose failure count exceeds a second predetermined threshold; and
admitting the first incoming packet if it is associated with an admitted individual TCP flow whose success count exceeds a third predetermined threshold.

6. The method of claim 4, wherein the probability of testing a respective individual TCP flow is initialized at one, and further comprising:
computing a window-based flow rate for a respective individual TCP flow; and
responsive to the flow rate of the respective individual TCP flow, determining if, based on the flow rate of the respective individual TCP flow, the respective individual TCP flow is a high-rate flow or a low-rate flow; and
responsive to determining that the respective individual TCP flow is a high-rate flow, adjusting the probability of testing the respective individual TCP flow based on the success count associated with the respective individual TCP flow.

7. The method of claim 6, further comprising:
responsive to determining that the respective individual TCP flow is a low-rate flow, setting the probability of testing the respective individual TCP flow to a value based at least in part on at least one of a total number of TCP flows or the third predetermined threshold.

8. The method of claim 1, further comprising:
computing a waiting time between tests for the individual TCP flow;
wherein, responsive to determining that the individual TCP flow is to be tested, performing the delaying only if the waiting time for the individual TCP flow has been exceeded, and otherwise admitting the first incoming packet.

9. The method of claim 1, further comprising:
performing a traffic classification configured to determine a protocol of respective ones of one or more received incoming packets;
admitting non-TCP packets of the one or more received incoming packets based on a predetermined bandwidth allocation among possible protocols of the incoming packets;
if one or more incoming packets are TCP packets, and if there is sufficient bandwidth in the predetermined bandwidth allocation for the TCP packets, determining whether a TCP connection has been established, and if a TCP connection has not been established, performing at least one of rate limiting, waiting time reduction for half-open connections, or incrementing backlog queue size; and if a TCP connection has been established, passing along a TCP packet as the first incoming packet.

10. The method according to claim 9, wherein the traffic classification further comprises checking at least one Internet Protocol (IP) related field of the incoming packets to determine a packet classification for respective incoming packets.

11. The method according to claim 10, further comprising setting the predetermined bandwidth allocation based on a traffic profile established based on packet classifications of the incoming packets.

12. The method according to claim 11, wherein the traffic classification is implemented at a firewall or edge router.

13. The method of claim 1, wherein calculating the probability of testing the individual TCP flow includes computing a function that is inversely proportional to a number of times that the individual flow was previously tested and determined to be a benign flow.

14. A non-transitory computer-readable medium containing software code that, upon execution by a processor, causes the processor to perform operations comprising:
- examining a first incoming packet to determine if it is associated with an individual TCP flow of an admitted TCP connection;
- responsive to determining that the first incoming packet is associated with an individual TCP flow of an admitted TCP connection, calculating a probability of testing the individual TCP flow of the admitted TCP connection with which the first incoming packet is determined to be associated;
- determining, based on the probability of testing the individual TCP flow, if the individual TCP flow is to be tested to determine if the individual TCP flow represents an attack flow or a benign flow;
- responsive to determining that the individual TCP flow is to be tested, testing the individual TCP flow to determine if the individual TCP flow represents an attack flow or a benign flow, said testing including:
  - delaying transmission of an acknowledgment of the first incoming packet to the source of the individual TCP flow; and
  - determining, based on at least one further incoming packet associated with the individual TCP flow, if the source of the individual TCP flow adjusts its transmission rate in response to the delaying; and
- admitting the first incoming packet if the source of the individual TCP flow adjusts its transmission rate in response to the delaying.

15. The computer-readable medium of claim 14, wherein the operations further comprise:
- responsive to determining that the first incoming packet is not associated with an admitted TCP connection, determining if an existing number of admitted TCP connections is less than a first predetermined threshold; and
- responsive to determining that the existing number of admitted TCP connections is less than the first predetermined threshold, admitting a further TCP connection and admitting the first incoming packet.

16. The computer-readable medium of claim 15, wherein admitting the further TCP connection includes initializing a test probability associated with the further TCP connection to one.

17. The computer-readable medium of claim 14, wherein the operations further comprise:
- for a respective individual TCP flow, maintaining a number of times that the source of the respective individual TCP flow reduces its transmission rate in response to the delaying, as a success count, and maintaining a number of times that the source of the respective individual TCP flow does not reduce its transmission rate in response to the delaying, as a failure count.

18. The computer-readable medium of claim 17, wherein the operations further comprise:
- dropping the first incoming packet if it is associated with an admitted individual TCP flow whose failure count exceeds a second predetermined threshold; and
- admitting the first incoming packet if it is associated with an admitted individual TCP flow whose success count exceeds a third predetermined threshold.

19. The computer-readable medium of claim 17, wherein the probability of testing a respective individual TCP flow is initialized at one, and wherein the operations further comprise:
- computing a window-based flow rate for a respective individual TCP flow; and
- responsive to the flow rate of the respective individual TCP flow, determining if, based on the flow rate of the respective individual TCP flow, the respective individual TCP flow is a high-rate flow or a low-rate flow; and
- responsive to determining that the respective individual TCP flow is a high-rate connection, adjusting the probability of testing the respective individual TCP flow based on the success count associated with the respective individual TCP flow.

20. The computer-readable medium of claim 19, wherein the operations further comprise:
- responsive to determining that the respective individual TCP flow is a low-rate flow, setting the probability of testing the respective individual TCP flow to a value based at least in part on at least one of a total number of TCP flows or the third predetermined threshold.

21. The computer-readable medium of claim 14, wherein the operations further comprise:
- computing a waiting time between tests for the individual TCP flow;
- wherein, responsive to determining that the individual TCP flow is to be tested, performing the delaying only if the waiting time for the individual TCP flow has been exceeded, and otherwise admitting the first incoming packet.

22. The computer-readable medium of claim 14, wherein the operations further comprise:
- performing a traffic classification configured to determine a protocol of respective ones of one or more received incoming packets;
- admitting non-TCP packets of the one or more received incoming packets based on a predetermined bandwidth allocation among possible protocols of the incoming packets;
- if one or more incoming packets are TCP packets, and if there is sufficient bandwidth in the predetermined bandwidth allocation for the TCP packets, determining whether a TCP connection has been established, and if a TCP connection has not been established, performing at least one of rate limiting, waiting time reduction for half-open connections, or incrementing backlog queue size; and if a TCP connection has been established, passing along a TCP packet as the first incoming packet.

23. The computer-readable medium according to claim 22, wherein the traffic classification further comprises checking at least one Internet Protocol (IP) related field of the incoming packets to determine a packet classification for respective incoming packets.

24. The computer-readable medium according to claim 23, wherein the checked field determines whether the packet is classified as one of TCP, UDP, ICMP and OTHER packets.

25. The computer-readable medium according to claim 23, wherein the operations further comprise setting the predetermined bandwidth allocation based on a traffic profile established based on packet classifications of the incoming packets.

26. The computer-readable medium of claim 14, wherein calculating the probability of testing the individual TCP flow includes computing a function that is inversely proportional to a number of times that the individual flow was previously tested and determined to be a benign flow.

* * * * *

UNITED STATES PATENT AND TRADEMARK OFFICE
CERTIFICATE OF CORRECTION

| | | |
|---|---|---|
| PATENT NO. | : 8,091,132 B2 | Page 1 of 1 |
| APPLICATION NO. | : 11/682119 | |
| DATED | : January 3, 2012 | |
| INVENTOR(S) | : Ansari et al. | |

It is certified that error appears in the above-identified patent and that said Letters Patent is hereby corrected as shown below:

Title Page, Item (56), under "OTHER PUBLICATIONS", in Column 2, Line 3, delete "Retreived" and insert -- Retrieved --, therefor.

On Title Page 2, Item (56), under "OTHER PUBLICATIONS", in Column 2, Line 2, delete "ADM" and insert -- ACM --, therefor.

In Fig. 7, Sheet 6 of 7, delete "FTP sink" and insert -- /FTP sink --, therefor.

Signed and Sealed this
Third Day of July, 2012

David J. Kappos
*Director of the United States Patent and Trademark Office*